United States Patent [19]

Barbier

[11] Patent Number: 5,278,426
[45] Date of Patent: Jan. 11, 1994

[54] OPTICAL LIQUID LEVEL SENSOR FOR PRESSURIZED SYSTEMS UTILIZING PRISMATIC ELEMENT

[76] Inventor: William J. Barbier, 6720 Christina Marie La., Hazelwood, Mo. 63042

[21] Appl. No.: 6,787

[22] Filed: Jan. 21, 1993

[51] Int. Cl.$^5$ ............................................. G01N 15/06
[52] U.S. Cl. ..................................... 250/577; 250/903
[58] Field of Search ............... 250/227.25, 574, 576, 250/577, 564, 903; 340/619; 356/440; 73/293

[56] References Cited

U.S. PATENT DOCUMENTS

| | | | |
|---|---|---|---|
| 4,134,022 | 1/1979 | Jacobsen | 250/577 |
| 4,155,013 | 5/1979 | Spiteri | 250/577 |
| 4,246,489 | 1/1981 | Yoshida et al. | 250/577 |
| 4,354,180 | 10/1982 | Harding | 340/619 |
| 4,598,742 | 7/1986 | Taylor | 250/577 |
| 4,998,022 | 3/1991 | Tregay | 250/577 |
| 5,072,595 | 12/1991 | Barbier | 250/577 |

*Primary Examiner*—David C. Nelms
*Assistant Examiner*—K. Shami
*Attorney, Agent, or Firm*—Daniel E. Kramer

[57] ABSTRACT

An optical sensor, having serviceable electronics, for monitoring the level of a liquid within a vessel having an exterior and an interior and for providing an electrical signal on the traverse of the liquid level past the sensor. The sensor comprises a fitting adapted to traverse the vessel wall, the fitting including a window having a prism shaped interior face and a planar exterior face sealed into the fitting and providing a fluid-tight optical path from the vessel interior to the vessel exterior. The fitting includes a chamber adjacent the planar face of the window and an electronic module shaped to fit the chamber. The module has an optical face. A light source and a light detector are positioned in the optical face to provide substantially zero clearance light communication between the window and both the source and the sensor, when the module is positioned within the chamber. The module includes electronics for supplying power to the light source and for providing different electrical signals on the presence, and on the absence of light at the detector. The sensor further includes means for resiliently securing the module against the window whereby intimate light communication between the window and the light source and the light sensor is achieved, and for readily removing the module for servicing ory replacement.

9 Claims, 2 Drawing Sheets

OPTICAL LIQUID LEVEL SENSOR FOR PRESSURIZED SYSTEMS UTILIZING PRISMATIC ELEMENT

FIELD OF THE INVENTION

The present invention relates to an optical device, including a windowed fitting and a removable and serviceable electronic module, intended to be positioned in the wall of a liquid containing vessel for sensing whether the interface between a liquid and vapor held within the vessel is above or below a predetermined point. The invention further relates to such a device where the window has a prismatic shape on the liquid side and a planar shape on the outside. The invention further relates to a such a device where the electronic module includes a light emitter and a light sensor and the module is removable and serviceable without access to the interior of the vessel or contact with or loss of liquid or loss or entry of vapor to the vessel interior.

DISCUSSION OF PRIOR ART

A clear discussion of the technical background in the use of optical methods for detection of the position of an interface between a liquid and a gas is found in U.S. Pat. No. 5,072,595 by Barbier. Others who have patents in this area include Spiteri, U.S. Pat. No. 4,155,013 who employs optical fibers to conduct light from a source to a prism and from the prism back to a detector; Harding, U.S. Pat. No. 4,354,180 who employs a prism with a light source and detector positioned at a prism face and an alternate light path, not affected by the presence or absence of liquid, as a check on the operating condition of his detection system; Jacobsen, U.S. Pat. No. 4,134,022 who employs light emitted at specified frequencies, transmitted via optical fibers to and from prisms placed in series and Yoshida, U.S. Pat. No. 4,246,489 who employs light source and detector, each positioned within separate cavities in a prism for isolation and improved sensitivity.

None of the cited patents show a specific mechanical construction for placing the light source and detector in an optimum position for operation with a minimum of light energy nor do they show specifically a removable and serviceable module encapsulated in plastic for waterproof construction, all as will become better apparent as details of the invention are described in the following specification, claims and appended drawings.

OBJECTS OF THE PRESENT INVENTION

The present invention has the following objects:

To provide an optical device for generating an electrical signal when the level of an observed liquid, which is contained within a vessel, rises above or falls below a predetermined level. To provide such a device having a vertical light transmitting window traversing the wall of the liquid containing vessel and which is self contained yet easily repaired by replacing a sealed water-tight module containing all the electronic, electrical and electro-optical components.

To provide a construction which more efficiently employs a limited light output, thereby minimizing the power required for operation and by that means reducing heat generated in the power supply circuit.

To provide such a device where the module is specially designed to provide efficient light transmission from its light source to the window, and from the window to its light sensor.

BACKGROUND OF THE INVENTION

This invention relates to liquid level sensing devices and more particularly to liquid level sensing devices applied to air conditioning and refrigeration systems. On refrigeration systems, this invention would be used for sensing oil level in a compressor crankcase as described in Barbier U.S. Pat. No. 5,103,648 or for detecting refrigerant liquid level in a receiver tank. In refrigeration systems, it is important that the all devices attached to the refrigerant piping be as pressure tight as possible because any emissions are considered as atmospheric pollutants. Therefore any service work required must be accomplished without requiring opening the piping system. For these reasons, it is important that level sensing devices be constructed so that the operating portion can be removed and serviced without opening the refrigerant containing piping system.

Present applications in receiver low and high level alarm applications use a mechanical float located inside of the receiver tank. As the float moves up and down with changes in liquid level, a rotational motion produced by the float motion moves a magnet. The motion of the magnetic field links through the tank wall with parts external of the pressurized system. The rotational motion of the float linked magnetically to an external moving arm is used to operate an electrical switching action. The Switchgauge made by Rochester Gauges is one of the types commonly used. This device provides a compact, low cost device which allows service of the electrical parts without opening the refrigeration system. Unfortunately, mechanical floats are subject to failure due to wear and dirt. For that reason, an opening in the tank wall must be provided for service removal for the float parts. Additionally the float arm length puts limits on its use in small tanks. Additionally the friction in the float and magnet mechanism reduces the accuracy of the switching point.

The present invention described herein overcomes these problems. By providing a compact level sensing device which uses a vertical optical window and associated electronic and electrical means for level detection, all moving parts inside of the pressurized vessel are eliminated. Accurate and repeatable level sensing is accomplished. Additionally the level sensing parts and associated power supply parts are designed to be compact and low in cost. To provide these functions in a small module, power for operating the light emitter must be accomplished from voltages as high as 240 v AC without the use of a transformer. Low voltage DC is required to supply electrical current to the light emitter and other electronic components. The heat produced in dropping the supply voltage from the supply line level to low voltage DC then becomes the major technical problem to solve. Light power is increased by any reduction in the optical distance by a function of the square of the ratio in the change in distance. Therefore optimum electronic construction for minimum light power requires that the light source and light detector be as close to the external prism face as possible to minimize the optical distance that light must travel to go from the light source to the internal prism reflective faces and back to the light detector. The present invention accomplishes this need by using a very efficient optical construction which reduces the heat loss in the power supply for module operation to an acceptable level. In addition the subject invention provides a construction of a level sensing device with a removable module for service that is self contained. In this way, the device is easily repaired by replacing a sealed watertight module containing all the electronic, electrical and electro-optical components including the means to operate from various power supply voltages.

SUMMARY OF THE INVENTION

An electro-optical device for differentiating between the presence of liquid and vapor at a sensing zone within a pressurized vessel. The pressurized vessel includes a vertical wall having a liquid side and an outside. The device provides a change in electrical output on a transition from liquid to vapor at the sensing zone. The device comprises a fitting adapted to traverse the vessel wall. The fitting has a vertical window for two way transmission of light between the outside and the liquid side of the vessel. The window has a prismatic shape on the liquid side. The prismatic shape comprises the sensing zone. The window has a substantially planar shape on the outside. The window has a center axis. The fitting further has an accessible chamber positioned adjacent the planar surface of the window. The device also includes a module having an optical face. There is a center axis traversing the optical face. The module is adapted to fit within the chamber with its optical face substantially adjacent the outer surface of the window. When the module is positioned within the chamber of the fitting, the center axes of the module and the window are substantially collinear. There is a light source positioned within the module at its optical face. The light source has a light emitting face and a depth. The light source has a conical light emission pattern, the pattern having a central axis positioned facing away from the optical face and the module. There is a light detector also positioned within the module at its optical face. The detector has a light receiving face and a depth. The light detector has a conical light detection pattern which has a central axis positioned facing away from the optical face and the module. The central axes of the light source and the light detector are positioned perpendicular to the optical face and equidistant from the module axis. The physical shapes of the light emitter and light detector have been selected of a type which have a substantially flat face so that they form part of the optical face of the module which faces the vertical window. In this way, the opto-electronic parts are placed for the shortest optical path and therefore the lowest required light current for detecting the presence of liquid or gas at the prism face.

BRIEF DESCRIPTION OF THE DRAWINGS

The foregoing summary, as well as the following description of the preferred embodiments, will be better understood when read in conjunction with the appended drawings. For the purpose of illustrating the invention, there is shown in the drawings an embodiment which is presently preferred, it being understood, however, that the invention is not limited to the specific instrumentalities or the precise arrangement of elements disclosed.

DETAILED DESCRIPTION OF THE INVENTION

Figure 1:
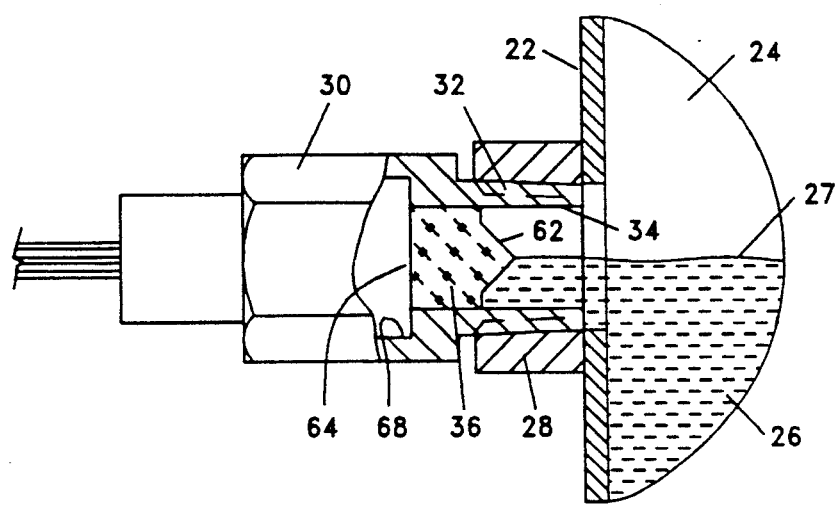
FIG. 1 is a side elevation of an embodiment of the present invention in partial cross-section showing the sensor installed in a tank wall.

Referring now to the drawings, wherein like references are used to indicate like elements, there is shown in FIG. 1 a side elevation of the present invention installed in the vertical wall of a tank. The vertical tank wall 22 has mounted thereon fitting 28 having internal or female threads intended to match and mate with male threads 32 on the sensor fitting 30, thereby forming a leak-tight connection between the sensor fitting 30 and the tank. Within the tank is shown liquid 26 and vapor 24. The level 27 of the liquid within the tank constitutes the liquid-vapor interface.

Sensor fitting 30 includes cylindrical passage 34 in which is a fused glass window 36 for optical communication between the interior and exterior of tank 22. Although fusing glass to metal is the preferred method of providing a leak-tight and mechanically secure joint between the sensor fitting 30 and window 36, other methods of securing such a joint, such as use of cements, glues, elastomers, epoxies, and gaskets are also satisfactory. Window 36 has a prismatic face 62, facing the interior of the tank, and a planar face 64 facing the outside of the tank. Prismatic face 62 has a conical surface having a 90 degree included angle at its vertex. Other embodiments of the present invention have conical prismatic surfaces 62 having other included angles, ranging from 25 degrees to 135 degrees. An important advantage of the conical prismatic shape is that its sensitivity to the critical position of the liquid vapor interface 27 is unchanged, regardless of the final angular position of the fitting 30 when it is screwed into tank fitting 28. Further the conical prismatic shape allows the light emitting and sensing module to be installed with the line traversing the centers of the light source 44 and the light sensor 46 to have any orientation, and further this conical prismatic shape eliminates any requirement that the module position be keyed to a special orientation or angular relationship between the prism and the module to work correctly.

Adjacent the planar exterior face 64 of window 36 in sensor fitting 30 is a chamber 68 which is shaped to accommodate electronic light emitting and sensing module 38. Module 38 is shown also with various degrees of detail in FIGS. 2, 3, 4, 5 and 6. Referring now to FIG. 3, the electronics for module 38 are mounted on circuit board 70. The light source 44 and the light sensor 46 are mounted on one side of the circuit board 70 with their active faces directed away from the circuit board. The source and sensor active faces are positioned in a plane which is parallel to the circuit board. The other components 42 among which are power supply components, including rectifier elements and filter capacitors, relays, either electro-mechanical or solid state, are positioned on the side of the circuit board opposite that on which the light source 44 and the light sensor 46 are positioned. In another embodiment of the present invention, no potting cup is employed and the components are positioned in a mold having the desired final shape of the module. The mold is flooded with the liquid potting compound. On hardening, the compound itself provides the external surface of the module. In still another embodiment of the invention, all the components are embodied in or embedded in a single electronic unit such as a double-in-line-package (dip) or are all positioned on the same side of the circuit board. Insulated wires 48, 49 provide power at a relatively high voltage to the module and provide a logical electrical output which can be utilized to activate an alarm or operate a device in response to a rise in liquid level 27 above the critical position on the prismatic shape 62 of window 36 on one hand, or on the drop of the liquid level 27 below the critical level on the prismatic window, on the other hand. The electronic elements, however constructed, are installed in potting cup 40. Potting cup 40 is formed of a polymeric material such epoxy which has significant temperature and structural integrity. The light source 44 and light sensor 46 are positioned within the cup 40 so that their active faces project through aperture 50 in the potting cup 40 and are flush with the outer planar surface of the bottom of potting cup 40. This outer planar surface forms the optical face of the module. The potting cup is then filled with a polymeric potting liquid which sets to a hard transparent material, thereby forming a integrated, water-tight, structural support for the electrical and the optical components described above and for the wire leads 48,49. In another embodiment of the present invention, the active faces of the light source 44 and the light sensor 46 are allowed to protrude slightly from the optical face of the module to better secure optical and physical contact between the window and the light producing and sensing elements. To retain satisfactory mechanical and leakage properties, only about 50% of the depth of the light source and sensor should be allowed to protrude from the optical face of the module. The depth of both the light source and the sensor are 0.080 inches, so the maximum protrusion of each from the optical face of the module is 0.040 inches. In still another embodiment, the active faces of the light source and the light sensor are recessed beneath the plane of the optical face of the module 38 by an amount not exceeding 50% of the depth of the light source and the sensor. The potting liquid surrounds all the components within the cup including the light source 44 and the light sensor 46, except that the active faces of the light source and the light sensor, being flush with or protruding from the optical face of the module are not covered. In the case where the active faces of the optical elements are recessed beneath the optical face of the module, the surfaces of the optical elements must be masked during the potting process to allow unrestricted optical communication between the elements and the planar surface of the window. In all embodiments of the present invention, the active faces of the light source and the light sensor are left exposed in the substantially planar optical face of the electronic module 38, thereby facilitating the intimate optical interaction between the light source, light sensor and the planar face 64 of window 36. Epoxy is the potting liquid now favored but other potting liquids having the required electrical, temperature and mechanical properties are also satisfactory.

Figure 5:
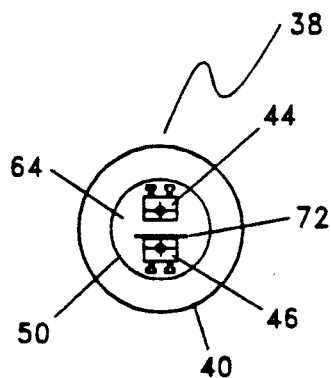
FIG. 5 is a view of the optical face of the module.
Figure 6:
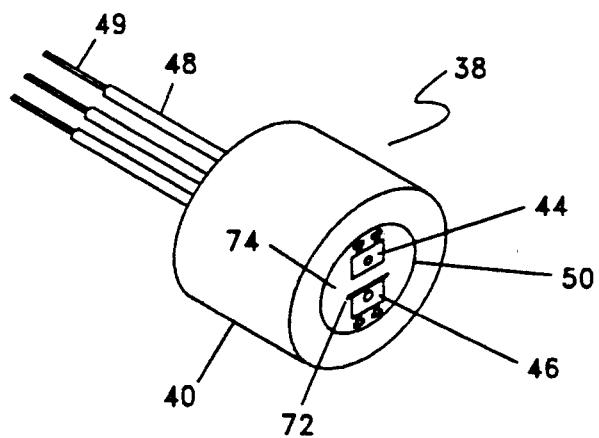
FIG. 6 is a view of the encapsulated module in 3 dimensional view.

FIGS. 5 and 6 shown the flush positioning of the active faces of the light source and light sensor with the planar face of the module and the positioning relationship of the light source 44 and the light sensor 46 to the completed electronic module.

Where the potting liquid is transparent, there is possibility of stray light emanating from light source 44, reaching and affecting the light sensor 46. To prevent this unwanted effect, which would mask a high liquid condition, an opaque barrier 72 is positioned between the light source 44 and the light sensor 46. This barrier 72 may be in the form of an opaque member placed between the light source and the light sensor or adjacent either, or an opaque coating placed on either or both, as shown in FIG. 3 in a preferred embodiment, or in another embodiment, may be in the form of a potting liquid, which in its solidified form is itself opaque to the light emanating from the light source 44.

Figure 2:
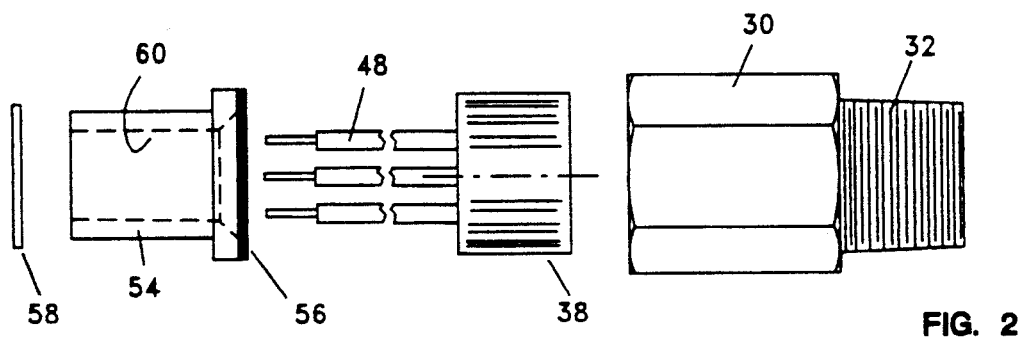
FIG. 2 is a side elevation of an exploded view of the main elements of the sensor.
Figure 3:
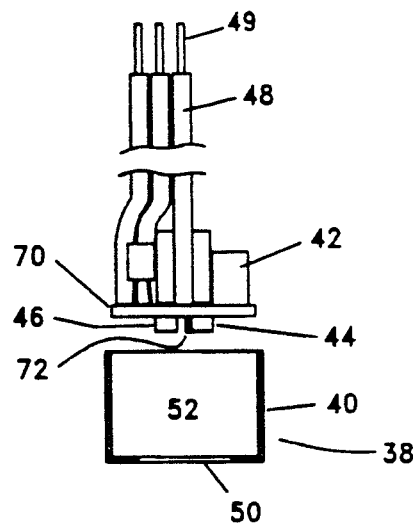
FIG. 3 is an exploded view of the opto-electronic module prior to encapsulation.
Figure 4:
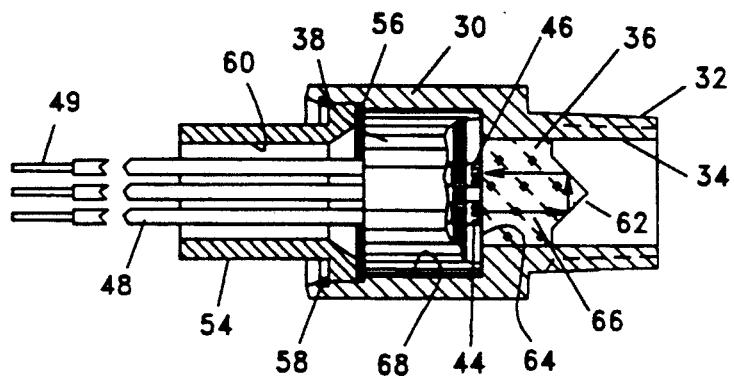
FIG. 4 is a side elevation of the sensor of the present invention shown in partial cross section.

Referring now to FIGS. 2 and 4, there is shown all the components of the complete device of the present invention. FIG. 2 is an exploded view shown prior to assembly or just after disassembly for servicing. FIG. 4 is an assembled view shown in partial cross-section. FIG. 4 shows module 38 positioned in the chamber 68 with the active face of the module tightly positioned against the planar face 64 of window 36, thereby providing the close approach between the light emitting and light sensing elements and the window which is required for most efficient transmission of light to and from the light emitting and light sensing active elements. It is the efficient light transmission between the light elements and the window which allows the system to operate with sufficiently low light intensity that the power required to generate the light does not causing overheating of the electronic components embedded in the module.

The light path 66, shown in FIG. 4, occurs under conditions of vapor interfacing the prismatic face of the window. Under that condition, light is reflected back to the light sensor 46 which reacts to the presence of the reflected light by causing the electronics to emit a first electronic signal. This signal is the presence of a voltage across the output leads. When a liquid 26 such a oil or refrigerant covers the prismatic face 62 of the window 36, the light emitted by the light source 44 is transmitted into the liquid and absorbed by it, rather than being reflected back to the light sensor 46, thereby causing the electronics embedded in the module to emit a second electronic signal. This signal is the absence of a voltage across the output leads. The electronics can be readily arranged, employing principles well known to those skilled in the electronic arts, to emit different signals on the presence and absence of liquid at the prismatic face of the window. Among the signals that can be provided are a high pitched tone versus a low pitched tone, a high current flow versus a low current flow as well as combinations of these and others.

In order to secure the close and intimate interaction between the optical face of the module 38 and the planar face of window 36 a ferrule 54 is employed having a elastomeric, compressible ring-like element 56, shown in FIGS. 2 and 4, to apply a force to the shoulder of the module opposite the optical face, thereby urging the optical face of the module against the planar face of the window for most efficient light transmission. The ferrule 54 is held in place within the fitting 30 of the device by a snap ring 58 which resides in a groove inside the end of the fitting opposite the window end, as shown in FIG. 4. The use of the elastomer allows a tolerance in machining of the fitting and the molding of the module, while assuring adequate force between the optical face of the module and the planar face of the window.

FIG. 5 shows the installation of the light emitter and light detector on the printed circuit board where the components are surface mounted to the printed circuit board. The components are mounted so that their light emitting and detecting faces are installed perpendicular to the printed circuit board and equidistant from the centerline of the printed circuit board and are in position to form part of the optical face when assembled and encapsulated into module form. In this embodiment of the invention, the selected parts with the required flat faced shape are the Motorola MLED77 light emitting diode and the Motorola MRD711 light sensitive transistor. Other manufacturers parts which have a similar shape suitable for this purpose could also be used. The light emitter and light detector must be mounted in a precise location relative to the center line of the prism shape. For that reason the light emitter and light detector are mounted on a printed circuit board and encapsulated with plastic. The plastic encapsulation also serves the purpose of preventing moisture from causing failure of the electronic circuit or accidental grounding of the electrical power supply. While the drawings show the use of a potting cup for encapsulation, total encapsulation by a molding compound is the alternate construction. FIG. 6 shows the encapsulated printed circuit board with the flat faced opto-electronic parts located in the molded assembly so as to be at the face of the assembly which will be against the vertical optical window when the module is assembled to the housing.

From the forgoing description it can be seen that the present invention provides a substantial improvement in size, sensitivity simplicity and serviceability over the prior devices available for the purpose. It must be appreciated by those skilled in the art that changes could be made in the above disclosed embodiments without departing from the broad inventive concepts taught herein. It is understood, therefore, that this invention is not limited to the particular embodiments disclosed but is intended to cover all modifications and equivalents thereof which are within the scope and spirit of the invention as defined by the appended claims.

I claim:

1. Electro-optical means for differentiating between the presence of liquid and vapor at a sensing zone within a pressurized vessel, the pressurized vessel includes a vertical wall having a liquid side and an outside, the means providing a change in electrical output on a transition from liquid to vapor at the zone, the means comprising: a fitting adapted to traverse the wall, the fitting having a window for two way transmission of light between the outside and the liquid side, the window having a prismatic shape on the liquid side, said shape comprising the sensing zone, and a substantially planar shape on the outside and a center axis, the fitting further having an accessible chamber positioned adjacent the planar surface of the window; a module having an optical face, and a center axis traversing the optical face, the module adapted to fit within the chamber with the optical face substantially adjacent the outer window surface and the center axes of the module and the window substantially collinear, a light source having a substantially flat light emitting face, the source being positioned within the module at the optical face, and a light detector having a substantially flat light receiving face, the detector being positioned within the module at the optical face, the central axes of the light source and light detector being positioned substantially perpendicular to the optical face of the module and equidistant from the module axis and means for urging the module against the window.

2. Means as recited in claim 1 further providing that the module comprises a cup shaped retainer open at both ends, a substantially circular circuit board having the light source and the light detector mounted on the first side and having circuit components including power supply and output transducer mounted on the second side, the circuit board and components being positioned within the retainer, and encapsulation compound substantially filling the retainer and surrounding the circuit board and components.

3. Means as recited in claim 2 further including a light barrier positioned between the light source and the detector.

4. Means as recited in claim 3 where the barrier is an opaque coating applied to the light source.

5. Means as recited in claim 3 where the barrier is an opaque coating applied to the light detector.

6. Means as recited in claim 3 where the barrier comprises an opaque potting compound surrounding the source and the detector.

7. Means as recited in claim 2 further providing that the light emitting face of the source and the light receiving face of the detector are positioned substantially flush with the optical face of the module.

8. Means as recited in claim 2 further providing that the light emitting face of the source and the light receiving face of the detector are positioned in a plane parallel to the optical face and spaced away from it and the module by a distance between zero and fifty percent of the depth of the respective source and detector.

9. Means as recited in claim 2 further providing that the light emitting face of the source and the light receiving faces of the detector are recessed within the module, the optical face of the module having a discontinuity adjacent each of the light emitting and light receiving faces whereby light emitted by the source can reach the window and light leaving the window can reach the detector.

* * * * *